US009016062B2

(12) United States Patent
Eser et al.

(10) Patent No.: US 9,016,062 B2
(45) Date of Patent: Apr. 28, 2015

(54) CHECKING AN EXHAUST GAS FLAP

(75) Inventors: Gerhard Eser, Hemau (DE); Thomas Burkhardt, Neutraubling (DE)

(73) Assignee: Continental Automotive GmbH, Hannover (DE)

( * ) Notice: Subject to any disclaimer, the term of this patent is extended or adjusted under 35 U.S.C. 154(b) by 117 days.

(21) Appl. No.: 13/981,715

(22) PCT Filed: Jan. 12, 2012

(86) PCT No.: PCT/EP2012/050407
§ 371 (c)(1),
(2), (4) Date: Jul. 25, 2013

(87) PCT Pub. No.: WO2012/100988
PCT Pub. Date: Aug. 2, 2012

(65) Prior Publication Data
US 2013/0327040 A1  Dec. 12, 2013

(30) Foreign Application Priority Data
Jan. 25, 2011  (DE) .......................... 10 2011 003 108

(51) Int. Cl.
*F02D 23/00*  (2006.01)
*F02B 37/00*  (2006.01)
*F02B 37/18*  (2006.01)
*F02D 41/00*  (2006.01)
(Continued)

(52) U.S. Cl.
CPC ............... *F02B 37/00* (2013.01); *F02B 37/18* (2013.01); *F02D 41/0007* (2013.01); *F02D 41/1454* (2013.01); *F02D 41/221* (2013.01); *Y02T 10/40* (2013.01); *Y02T 10/144* (2013.01)

(58) Field of Classification Search
USPC .............................................. 60/600, 602, 607
See application file for complete search history.

(56) References Cited

U.S. PATENT DOCUMENTS

| 6,050,250 A  | 4/2000 | Kerkau ......................... 123/688 |
| 6,250,145 B1 | 6/2001 | Honold et al. ............. 73/114.77 |
| 6,272,860 B1 | 8/2001 | Klein et al. ..................... 60/602 |

(Continued)

FOREIGN PATENT DOCUMENTS

| DE | 19833148 A1 | 1/2000 | ................ F01N 3/22 |
| DE | 19834762 A1 | 2/2000 | .............. F02B 37/18 |

(Continued)

OTHER PUBLICATIONS

International Search Report and Written Opinion, Application No. PCT/EP2012/050407, 14 pages, Jul. 20, 2012.

*Primary Examiner* — Jesse Bogue
(74) *Attorney, Agent, or Firm* — King & Spalding L.L.P.

(57) ABSTRACT

A method is disclosed for checking a valve on an exhaust gas turbocharger of an internal combustion engine, wherein an exhaust gas flow exits the internal combustion engine, a first portion of said flow flowing through a turbine of the exhaust gas turbocharger into an exhaust gas system and a second portion flowing through the valve into the exhaust gas system, wherein said method includes the steps of varying a fuel-to-air ratio in a fresh gas supplied to the internal combustion engine, determining a residual oxygen content in the exhaust gas system, and determining that the valve is defective if a variation of the residual oxygen content occurs in a manner different than a predetermined manner of the variation of the fuel-to-air ratio in the fresh gas. A device for checking the valve can be integrated into an integrated engine control unit of the internal combustion engine.

16 Claims, 3 Drawing Sheets

(51) Int. Cl.
*F02D 41/22* (2006.01)
*F02D 41/14* (2006.01)

(56) References Cited

U.S. PATENT DOCUMENTS

| | | | |
|---|---|---|---|
| 2008/0022968 A1* | 1/2008 | Miyauchi et al. | 123/339.15 |
| 2009/0077965 A1 | 3/2009 | Pursifull | 60/602 |
| 2011/0289919 A1* | 12/2011 | Oyagi et al. | 60/612 |
| 2013/0283783 A1* | 10/2013 | Sato | 60/603 |

FOREIGN PATENT DOCUMENTS

| | | | |
|---|---|---|---|
| DE | 19837834 A1 | 2/2000 | F02B 39/16 |
| DE | 10118675 C1 | 5/2002 | F02B 37/18 |
| DE | 102008018133 A1 | 3/2010 | F02B 39/16 |
| DE | 102010031195 A1 | 1/2011 | F02B 37/18 |
| EP | 0894958 A2 | 2/1999 | B02B 37/007 |
| JP | 2009228601 A | 10/2009 | F02D 43/00 |
| JP | 2010106787 A | 5/2010 | F02B 37/00 |
| WO | 2012/100988 A2 | 8/2012 | F02D 41/00 |

* cited by examiner

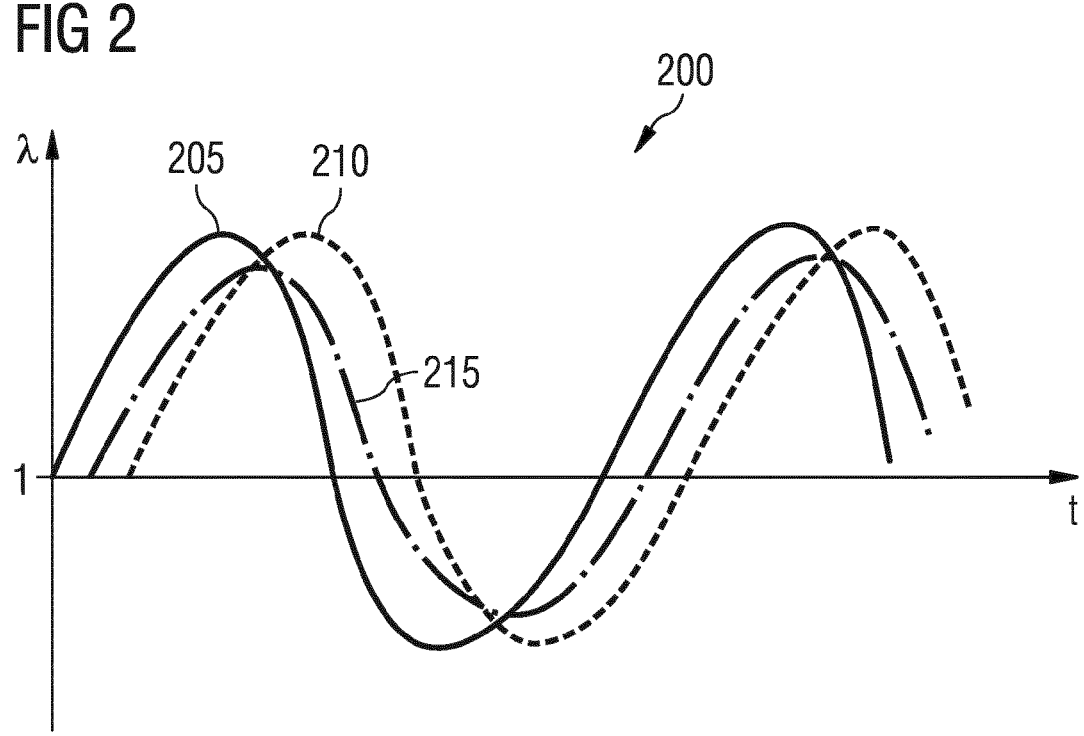

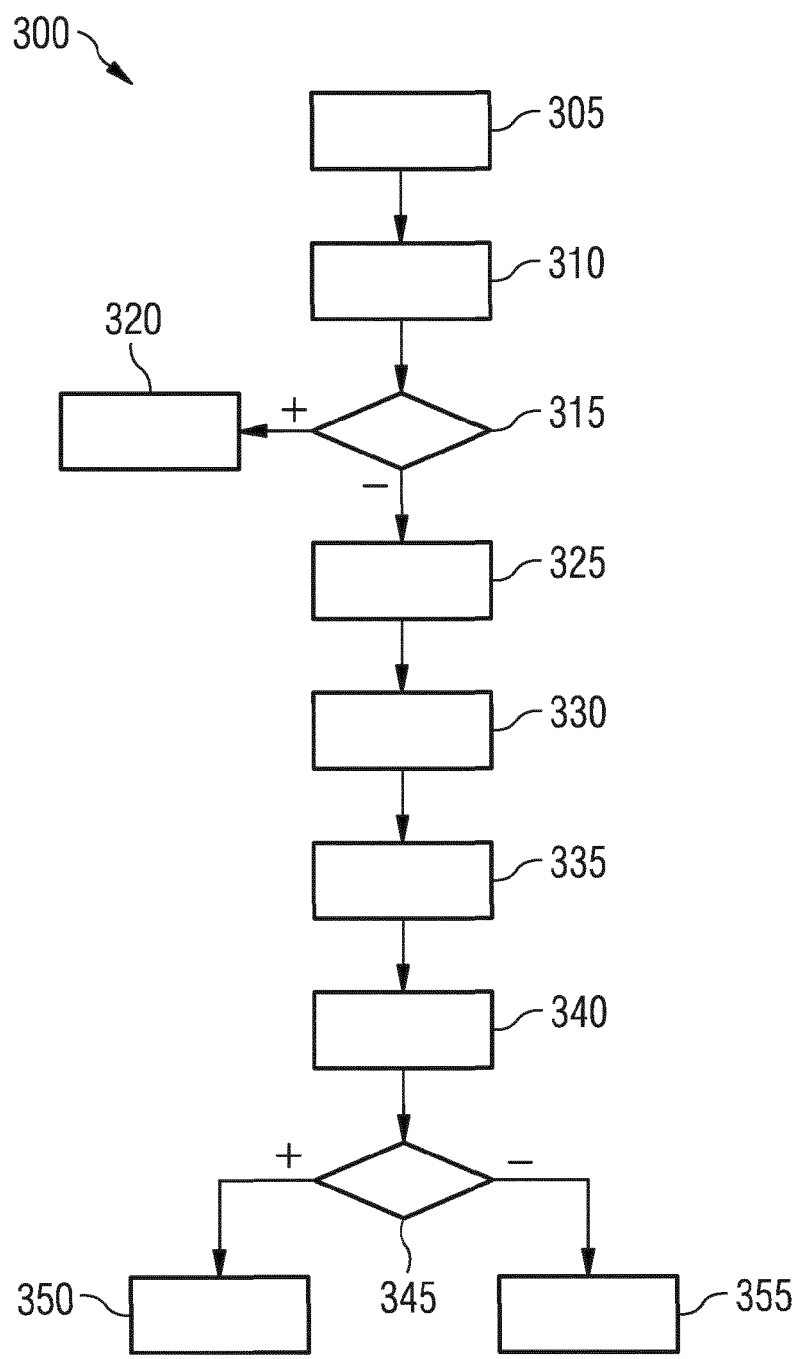

CHECKING AN EXHAUST GAS FLAP

CROSS-REFERENCE TO RELATED APPLICATIONS

This application is a U.S. National Stage Application of International Application No. PCT/EP2012/050407 filed Jan. 12, 2012, which designates the United States of America, and claims priority to DE Application No. 10 2011 003 108.1 filed Jan. 25, 2011, the contents of which are hereby incorporated by reference in their entirety.

TECHNICAL FIELD

This disclosure relates to a method and to a device for checking an exhaust gas flap on a turbocharger.

BACKGROUND

An exhaust gas turbocharger on an internal combustion engine uses the energy of the exhaust gases output by the internal combustion engine to drive a turbine which is coupled to a compressor that compresses a fresh gas for the internal combustion engine. To boost the power of a turbocharger of this kind, a valve in the form of an exhaust gas flap ("wastegate", "bypass valve") can be used, said valve directing a portion of the exhaust gas flow past the turbine into an exhaust gas system. The exhaust gas flap is usually integrated as a spherical slide valve or similar structure into the turbine housing. The exhaust gas flap is moved by an actuator having a transmission mechanism. The actuator can be an electric positioning motor or a pneumatic device with electropneumatic pressure control, for example. The actuator can have a position transmitter for determining the position of the actuator.

The position of the exhaust gas flap is used directly to control the power of the turbocharger and hence indirectly also to adjust the required boost pressure of the fresh gas of the internal combustion engine and hence of a required engine mode. For this reason, incorrect positioning of the exhaust gas flap can cause engine behavior which deviates from the required engine behavior. The deviation can be relevant to safety if the internal combustion engine outputs more than a required power, for example. If, for example, the internal combustion engine is driving a motor vehicle, unwanted acceleration of the motor vehicle can occur as a result.

The actual position of the exhaust gas flap is normally monitored, therefore. In addition or as an alternative to determination of the position of the exhaust gas flap, the operation of the exhaust gas turbocharger can be subject to plausibility checking through observation of a boost pressure. If the boost pressure does not correlate with a desired position of the exhaust gas flap, however, it is still not possible from this to deduce a specific fault since, for example, a leak downstream of the compressor or contamination of an air filter can have a similar effect to an exhaust gas flap which can no longer be fully closed.

SUMMARY

One embodiment provides a method for checking a valve on an exhaust gas turbocharger of an internal combustion engine, wherein an exhaust gas flow exits the internal combustion engine, a first portion of said flow flowing through a turbine of the exhaust gas turbocharger into an exhaust gas system and a second portion flowing through the valve into the exhaust gas system, wherein said method comprises the following steps: variation of a fuel-to-air ratio in a fresh gas supplied to the internal combustion engine; determination of a residual oxygen content in the exhaust gas system; and determination that the valve is faulty if a variation of the residual oxygen content follows the variation of the fuel-to-air ratio in the fresh gas in a manner different than a predetermined manner.

In a further embodiment, variation takes place in an operating state of the internal combustion engine in which the valve is activated so as to be partially open.

In a further embodiment, variation takes place according to a predetermined periodic pattern.

In a further embodiment, the predetermined manner is stored in a memory and the variation of the residual oxygen content is compared with the stored manner.

In a further embodiment, the predetermined manner is determined on the basis of a preceding measurement of the residual oxygen content in the exhaust gas system of a corresponding internal combustion engine during a corresponding variation of the fuel-to-air ratio when the valve is functional.

In a further embodiment, the predetermined manner is determined on the basis of the times taken by exhaust gas to flow through the turbine and through the valve.

In a further embodiment, the method further comprises the following preceding steps: determination of a desired position of the valve; detection of a boost pressure of the exhaust gas turbocharger; and determination that the boost pressure does not correspond to the desired pressure.

Another embodiment provides a computer program product having program code means stored in non-transitory computer-readable media and executable by a processor to perform any of the methods disclosed above.

Another embodiment provides a device for checking a valve on an exhaust gas turbocharger of an internal combustion engine, wherein an exhaust gas flow exits the internal combustion engine, a first portion of said flow flowing through a turbine of the exhaust gas turbocharger into an exhaust gas system and a second portion flowing through the valve into the exhaust gas system, wherein said method comprises the following elements: a control device for variation of a fuel-to-air ratio in a fresh gas supplied to the internal combustion engine; a sampling device for determination of a residual oxygen content in the exhaust gas system; and a processing device for determination that the valve is faulty if a variation of the residual oxygen content follows the variation of the fuel-to-air ratio in the fresh gas in a manner different than a predetermined manner.

In a further embodiment, the device is configured to control an operating state of the internal combustion engine.

BRIEF DESCRIPTION OF THE DRAWINGS

Example embodiments are discussed below with reference to the attached figures, in which:

FIG. 2 shows a diagram comprising profiles of residual oxygen content levels at various points on the internal combustion engine in FIG. 1; and FIG. 3 shows a flow diagram of a method for determining a faulty valve on the internal combustion engine of FIG. 1.

DETAILED DESCRIPTION

Figure 1:
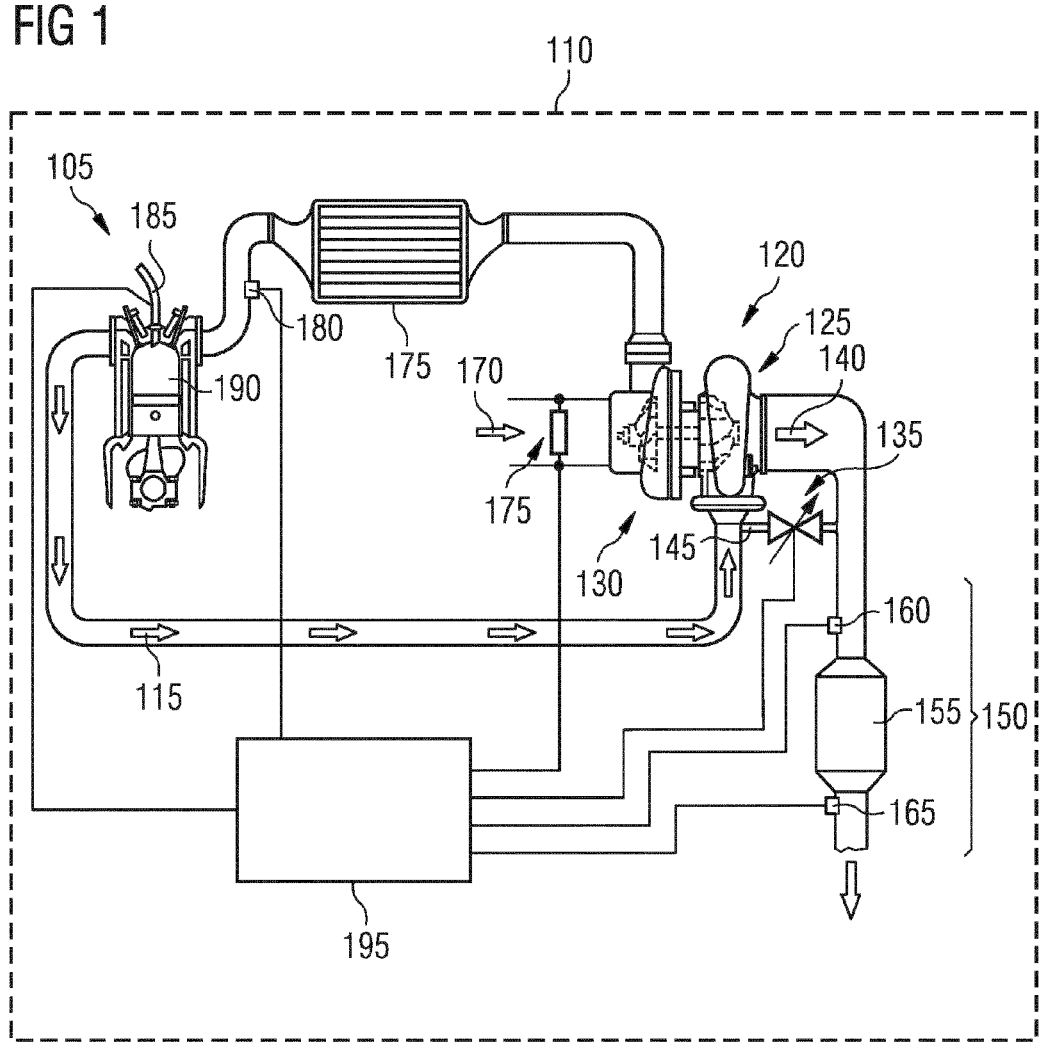
FIG. 1 shows a schematic representation of an internal combustion engine in a motor vehicle.

Some embodiments provide a method and a device for targeted detection of incorrect positioning of the exhaust gas flap without presupposing position feedback of the exhaust gas flap.

An exhaust gas flow exits an internal combustion engine, a first portion of said flow flowing through a turbine of an exhaust gas turbocharger into an exhaust gas system and a second portion flowing through a valve (exhaust gas flap, wastegate) into the exhaust gas system. A method for checking the valve comprises the steps of variation of a fuel-to-air ratio in a fresh gas supplied to the internal combustion engine, determination of a residual oxygen content in the exhaust gas system, and determination that the valve is faulty if a variation of the residual oxygen content follows the variation of the fuel-to-air ratio in the fresh gas in a manner different than a predetermined manner.

As a result, there is the potential for pinpointing a fault occurring in the region of the exhaust gas turbocharger.

It may thus be possible, under certain circumstances, to maintain operation of the internal combustion engine, despite a fault. Moreover, repair work on the exhaust gas turbocharger can be planned or carried out in a targeted manner.

Variation preferably takes place in an operating state of the internal combustion engine in which the valve is activated so as to be partially open.

Particularly in the case of a partially open valve, there may be differences in the flow resistance of portions of the exhaust gas flow over the different paths through the turbine and through the valve. If the two portions of the exhaust gas flow come together again, there will be differences in the residual oxygen content thereof, depending on the degree of opening of the valve. It is therefore possible to predetermine an expected residual oxygen content of the mixed exhaust gas flows and to compare it with the value determined. If the residual oxygen content coincides, it is possible to establish that there is no fault.

The partially open valve can be used to increase the difference in the residual oxygen content of the two portions of the exhaust gas flow, making it possible to increase the accuracy of determination of the method. Moreover, sticking of the valve in a fully open or fully closed position may occur more frequently than other faults and may be detected more effectively in the manner indicated.

Variation can take place according to a predetermined periodic pattern. The variation can be sinusoidal, triangular or rectangular, for example. Determination of the faulty valve can comprise a comparison of amplitudes, phases and periods of the varied quantity with the quantity determined. It is thereby possible to increase the reliability of determination of the method.

The predetermined manner can be stored in a memory and the variation of the residual oxygen content can be compared with the stored manner. The predetermined manner can thus also comprise a complex signal form which is, for example, typical of the internal combustion engine or of a particular operating state of the internal combustion engine.

The predetermined manner stored in the memory can be determined on the basis of a preceding measurement of the residual oxygen content in the exhaust gas system of a corresponding internal combustion engine during a corresponding variation of the fuel-to-air ratio when the valve is functional. This makes it possible, on the one hand, to sample the predetermined manner on an internal combustion engine used as a reference and, on the other hand, to record the predetermined manner on the specific internal combustion engine connected to the exhaust gas turbocharger at a point in time at which the internal combustion engine and the surrounding components are known to be free from faults, e.g. in the context of the production of the motor vehicle.

In one embodiment, the predetermined manner is determined on the basis of the times taken by exhaust gas to flow through the turbine and through the valve. The manner in which the residual oxygen content of the portion of the exhaust gas flow passing through the turbine and that of the portion of the exhaust gas flow passing through the valve differ can be determined, for example, by calculation on the basis of a desired position of the valve, thus allowing the predetermined manner in which the residual oxygen content follows the variation of the fuel-to-air ratio in the fresh gas when the valve is intact to be derived therefrom. By virtue of such algorithmic or numerical determination of the predetermined manner, it is possible to dispense with a training phase or recording of reference values.

The method described can be preceded by steps comprising determination of a desired position of the valve, detection of a boost pressure of the exhaust gas turbocharger, and determination that the boost pressure does not correspond to the desired pressure. To save resources, the method for specific determination of a faulty valve thus can be carried out only when the presence of a nonspecific fault in the region of the exhaust gas turbocharger is already known.

A computer program product having program code means for carrying out the method described can run on a processing device or be stored on a computer-readable data carrier.

A device for checking of the valve comprises a control device for variation of a fuel-to-air ratio in a fresh gas supplied to the internal combustion engine, a sampling device for determination of a residual oxygen content in the exhaust gas system, and a processing device for determination that the valve is faulty if a variation of the residual oxygen content follows the variation of the fuel-to-air ratio in the fresh gas in a manner different than a predetermined manner.

One advantageous possibility is to make use of sensors and devices which are already present on a known internal combustion engine and the components surrounding it.

In a preferred embodiment, the device is configured to control an operating state of the internal combustion engine. Thus, a known engine control system can be used to carry out the method described. The functionality described can thus be retrofitted without modifying installed parts, even on an existing internal combustion engine or a vehicle having said components.

FIG. 1 shows a schematic representation of an internal combustion engine 105 in a motor vehicle 110. An exhaust gas flow 115 of the internal combustion engine 110 leads to an exhaust gas turbocharger 120. The exhaust gas turbocharger 120 comprises a turbine 125 and a compressor 130 coupled to the turbine 125. Mounted in the region of the turbine 125 is a valve 135, which is also known as an exhaust gas flap or wastegate or as a bypass valve. The valve 135 is normally accommodated in a housing of the exhaust gas turbocharger 120 and not embodied separately, as in the illustration in FIG. 1.

A first portion 140 of the exhaust gas flow 115 of the internal combustion engine 105 passes through the turbine 125 of the exhaust gas turbocharger 120, while a second portion 145 of the exhaust gas flow 115 flows through the valve 135. Both portions 140, 145 of the exhaust gas flow 115 are directed jointly into an exhaust gas system 150 and mixed therewith one another. The exhaust gas system 150 comprises a catalyzer 155, through which the two portions 140, 145 of the exhaust gas flow 115 flow, a first lambda probe 160, arranged ahead of the catalyzer 155 in the direction of flow, and a second lambda probe 165, arranged after the catalyzer 155 in the direction of flow.

A muffler and pipe system for carrying away the exhaust gas flow after the second lambda probe 165 is not shown.

The energy of the first portion 140 of the exhaust gas flow 115 of the internal combustion engine 105, which flows through the turbine 125, drives the compressor 130 of the exhaust gas turbocharger 120. The compressor 130 draws in an air flow 170 from an external area through an air mass meter 175. The air flow 170 drawn in is compressed in the compressor 130, heating up in the process. The heated air flow 170 is cooled in a charge air cooler 175 before being passed to the internal combustion engine 105. A boost pressure meter 180 is arranged in a region between the charge air cooler 175 and the internal combustion engine 105. The compressed and cooled air flowing to the internal combustion engine 105 is mixed with fuel by means of a fuel injector 185 in or directly at the internal combustion engine 105, giving rise to what is known as a fresh gas 190, which is then burned in the internal combustion engine 105.

A control unit 195 is configured to control the internal combustion engine 105 and/or the components surrounding it. The control unit 195 is connected to the fuel injector 185, the boost pressure meter 180, the air mass meter 175, the valve 135, the first lambda probe 160 and the second lambda probe 165. Further sensors, e.g. for a crank angle or a gas pedal position, can likewise be connected to the control unit 195. The control unit 195 can furthermore also be connected to further actuators, e.g. an ignition device for the internal combustion engine 105 or a heating element for the lambda probes 160 and 165. As is familiar to a person skilled in the art, not all the elements illustrated in FIG. 1 are required for the operation of the internal combustion engine 105. It may be sufficient, for example, to use just one of the lambda probes 160, 165. The invention is described in greater detail below, without entering into such known variations of embodiments.

The control unit 195 controls an operating state of the internal combustion engine 105 in accordance with sampled measured values and positions of actuators. To adjust the compression capacity of the exhaust gas turbocharger 120, the control unit 195 acts on the valve 135, in particular. In order to reduce the capacity of the exhaust gas turbocharger 120, the valve 145 is activated so as to open, increasing the second portion 145 of the exhaust gas flow 115 and consequently reducing the first portion 140 of the exhaust gas flow 115. As a result, there is a drop in the driving power of the turbine 125 at the compressor 130, and a speed of the exhaust gas turbocharger 120 falls. Accordingly, there is a drop in the compression capacity of the compressor 130, and the boost pressure at the boost pressure meter 180 falls. The power delivered by the internal combustion engine 105 can thereby be limited or reduced.

In normal operation of the internal combustion engine 105, the control unit 195 acts on the actuators mentioned so as to ensure that the fresh gas 190 in the internal combustion engine 105 has neither an excess of fuel nor an excess of air. In this case, the term "stoichiometric ratio" is used. If the fresh gas 190 has a ratio different from the stoichiometric ratio, then there is still unburned fuel or unburned air or oxygen in the exhaust gas flow 115 after combustion in the internal combustion engine 105. The remaining residual oxygen content in the exhaust gas flow 115 is determined by the lambda probes 160, 165 and is available as an input variable to the control unit 195.

In order to check that the valve 135 is working properly, the control unit 195 can move the valve 135 into a predetermined desired position and then sample the boost pressure in the boost pressure meter 180. At a predetermined operating point of the internal combustion engine 105, which is characterized, in particular, by a speed of the internal combustion engine 105, it is possible to predetermine what boost pressure must be established in the region of the boost pressure meter 180 if the valve 135 is actually occupying the desired position. If the desired position of the valve 135 does not correlate with the particular boost pressure, however, reasons other than a faulty valve 135 may also be responsible. For example, an air filter (not shown), through which the air flow 170 flows, may be blocked or torn. It is therefore only possible to diagnose an unspecific fault in the region of the exhaust gas turbocharger 120 in the manner described.

In order to check the operation of the valve 135 more precisely, the control unit 195 can vary a quantity of fuel injected into the internal combustion engine 105 per unit time in a predetermined operating state of the internal combustion engine 105 in order to modify the fuel-to-air ratio in the fresh gas 190. The modification is preferably performed periodically at a predetermined frequency and amplitude. In accordance with the variation in the fuel supplied, there is also a variation in the residual oxygen content in the exhaust gas flow 115. A length of travel of the first portion 140 and of the second portion 145 of the exhaust gas flow 115 is different, however, since the path through the valve 135 is usually shorter than that through the turbine 125. Moreover, the resistance to flow through the valve 135 is generally different to the resistance to flow through the turbine 125. In order to keep the resistance to flow different as far as possible, the control unit 195 can move the valve 135 into a partially open position before varying the fuel-to-air ratio in the fresh gas 190.

The residual oxygen content of the two portions 140, 145 of the exhaust gas flow 115 differs in phase and amplitude. When the two portions 140, 145 mix again in the region of the exhaust gas system 150, a resultant residual oxygen content is established, depending on the mixing ratio. The mixing ratio of the portions 140, 145 in the region of the exhaust gas system 150 is primarily dependent on an actual position of the valve 135, and therefore the variation of the residual oxygen content in the region of the lambda probes 160, 165 is characteristic of the actual position of the valve 135.

In one embodiment, a profile of the residual oxygen content in the exhaust gas system 150 in the relevant operating state of the internal combustion engine 105 when the valve 135 is occupying the desired position is stored in the control unit 195. In another embodiment, the profile is determined algorithmically by the control unit 195. In both cases, the residual oxygen profile recorded by the lambda probes 160, 165 is compared with the predetermined profile, and a faulty valve 135 is inferred if the profiles do not correspond.

FIG. 2 shows a diagram 200 containing illustrative profiles of residual oxygen content levels. A time t is plotted in the horizontal direction, and an oxygen content X is plotted in the vertical direction. The variation in the fuel-to-air ratio in the fresh gas 190 is sinusoidal in FIG. 1. However, this variation is only illustrative: fundamentally, any profile can be used for determining a faulty valve 135 as described, and periodic profiles especially are suitable for determination.

A first profile 205 gives a qualitative indication of the residual oxygen content in the first portion 140 of the exhaust gas flow 115 flowing through the turbine 125 of the exhaust gas turbocharger 120. The first profile 205 has essentially the shape of the variation in the fuel-to-air ratio of the fresh gas 190.

A second profile 210 reflects the residual oxygen content in the second portion 145 of the exhaust gas flow 115. The position of the valve 135 means that the resistance to flow for the second portion 145 is greater than for the first portion 140, and therefore the second profile 210 is phase-shifted to the right by a corresponding amount of time relative to the first profile 205. The degree of the phase shift is dependent here on the actual position of the valve 135.

A third profile 215 reflects the residual oxygen content of the two intermixed portions 140 and 145 of the exhaust gas flow 115. It can be seen that both the amplitude and the phase of the third profile 215 are dependent on the phase shift in the second profile 210 from the first profile 205 and hence on the actual position of the valve 135. If the third profile 215 does not coincide with a predetermined profile which should be obtained given a corresponding variation in the fuel-to-air ratio, it is possible to infer a faulty valve 135 with a high degree of certainty.

FIG. 3 shows a flow diagram of a method 300 for determining whether the valve 135 in FIG. 1 is faulty.

In a first step 305, a desired position of the valve 135 is determined. This is usually accomplished by activating the valve 135 so that it moves into the desired position. In a step 310, the boost pressure in the region of the boost pressure meter 180 is then detected. In a following step 315, a check is made to determine whether the detected boost pressure corresponds to the desired position. If so, the method ends in a step 320. Otherwise, a fault in the region of the components connected to the internal combustion engine 105, in particular in the region of the exhaust gas turbocharger 120, can be assumed. In a variation of the method 300, it is also possible for steps 305 to 320 to be omitted.

In a step 325, an operating state of the internal combustion engine 305 is determined. The method 300 can be carried out on the control unit 195, wherein the control unit 195 can shift the internal combustion engine 105 specifically into a predetermined operating state in step 325.

In a following step 330, a variation in the fuel-to-air ratio in the fresh gas 190 is initiated. In a step 335, sampling is then carried out to determine in what way the residual oxygen content of the exhaust gas flow 115 is then varying in the region of the exhaust gas system 150. In a further step 340, the system determines in what way the residual oxygen content would have to vary if the valve 135 were actually in the position to which it has been directed in step 325.

After this, a check is made in a step 345 to determine whether the manner sampled in step 335 correlates with the manner predetermined in step 340. If so, the system determines that the valve 135 is operating correctly. Once steps 305 to 315 have been carried out, it must be assumed that there is a fault at some other point in the region of the exhaust gas turbocharger 120.

If the manner sampled in step 335 does not correlate with the manner predetermined in step 340, the system determines in a step 355 that an actual position of the valve 135 does not correspond to the target desired position and that the valve 135 is therefore faulty.

What is claimed is:

1. A method for checking a valve of an exhaust gas turbocharger of an internal combustion engine, wherein an exhaust gas flow exits the internal combustion engine, and wherein a first portion of said flow flows through a turbine of the exhaust gas turbocharger into an exhaust gas system and a second portion flows through the valve into the exhaust gas system, said method comprising:
   varying a fuel-to-air ratio in a fresh gas supplied to the internal combustion engine;
   determining a residual oxygen content in the exhaust gas system;
   determining a variation of the residual oxygen content; and
   determining that the valve is faulty in response to determining that the variation of the residual oxygen content does not follow the variation of the fuel-to-air ratio in the fresh gas in a predetermined manner.

2. The method of claim 1, wherein the fuel-to-air ratio is varied during an operating state of the internal combustion engine in which the valve is activated to be partially open.

3. The method of claim 1, the fuel-to-air ratio is varied according to a predetermined periodic pattern.

4. The method of claim 1, wherein the predetermined manner is stored in a memory and wherein the variation of the residual oxygen content is compared with the stored predetermined manner.

5. The method of claim 4, comprising determining the predetermined manner based on a preceding measurement of the residual oxygen content in the exhaust gas system of a corresponding internal combustion engine during a corresponding variation of the fuel-to-air ratio when the valve is functional.

6. The method of claim 1, comprising determining the predetermined manner based on a detected duration for exhaust gas to flow through the turbine and through the valve.

7. The method of claim 1, further comprising:
   determining a desired position of the valve;
   detecting a boost pressure of the exhaust gas turbocharger; and
   determining that the boost pressure does not correspond to the desired pressure.

8. A device for checking a valve of an exhaust as turbocharger of an internal combustion engine, wherein an exhaust gas flow exits the internal combustion engine, and wherein a first portion of said flow flows through a turbine of the exhaust gas turbocharger into an exhaust gas system and a second portion flows through the valve into the exhaust gas system, said device comprising:
   a control device configured to vary a fuel-to-air ratio in a fresh gas supplied to the internal combustion engine;
   a sampling device configured to determine a residual oxygen content in the exhaust gas system; and
   a processing device configured to:
      determine a variation of the residual oxygen content; and
      determine that the value is faulty in response to determining that the variation of the residual oxygen content does not follow the variation of the fuel-to-air ratio in the fresh gas in a predetermined manner.

9. The device of claim 8, wherein the device is configured to control an operating state of the internal combustion engine.

10. The device of claim 8, wherein the control device is configured to vary the fuel-to-air ratio during an operating state of the internal combustion engine in which the valve is activated to be partially open.

11. The device of claim 8, wherein the control device is configured to vary the fuel-to-air ratio according to a predetermined periodic pattern.

12. The device of claim 8, comprising a memory storing the predetermined manner, wherein the processing device is configured to compare the variation of the residual oxygen content with the stored predetermined manner.

13. The device of claim 12, wherein the processing device is configured to determine the predetermined manner based on a preceding measurement of the residual oxygen content in the exhaust gas system of a corresponding internal combustion engine during a corresponding variation of the fuel-to-air ratio when the valve is functional.

14. The device of claim 8, wherein the processing device is configured to determine the predetermined manner based on a detected duration for exhaust gas to flow through the turbine and through the valve.

15. The device of claim 8, wherein the processing device is configured to:
- determining a desired position of the valve;
- detecting a boost pressure of the exhaust gas turbocharger; and
- determining that the boost pressure does not correspond to the desired pressure.

16. A computer program product for checking a valve of an exhaust gas turbocharger of an internal combustion engine, wherein an exhaust gas flow exits the internal combustion engine, and wherein a first portion of said flow flows through a turbine of the exhaust gas turbocharger into an exhaust gas system and a second portion flows through the valve into the exhaust gas system, the computer program product comprising computer instructions stored in non-transitory computer-readable media and executable by a processor to:
- vary a fuel-to-air ratio in a fresh gas supplied to the internal combustion engine;
- determine a residual oxygen content in the exhaust gas system;
- determine a variation of the residual oxygen content; and
- determine that the valve is faulty in response to determining that the variation of the residual oxygen content does not follow the variation of the fuel-to-air ratio in the fresh gas in a predetermined manner.

* * * * *